_United States Patent Office_

3,840,564
Patented Oct. 8, 1974

3,840,564
CERTAIN 1-PHENYL-1-OXYGEN HETEROCYCLIC
CARBONYLOXY UREAS
John Krenzer, Oak Park, and Sidney B. Richter, Chicago,
Ill., assignors to Velsicol Chemical Corporation, Chicago, Ill.
No Drawing. Continuation of abandoned application Ser.
No. 781,578, Dec. 5, 1968. This application Feb. 16,
1972, Ser. No. 226,964
Int. Cl. C07d 5/16
U.S. Cl. 260—347.3                    2 Claims

ABSTRACT OF THE DISCLOSURE

This invention discloses new chemical compounds of the formula

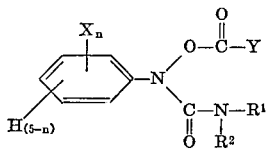

wherein X is selected from the group consisting of alkyl, alkenyl, halogen, haloalkyl, alkoxy, nitro and dialkylamino; $n$ is an integer from 0 to 5; $R^1$ and $R^2$ are independently selected from the group consisting of hydrogen and alkyl; and Y is a substituted or unsubstituted heterocyclic ring consisting of from 3 to 5 carbon atoms and a maximum of 1 atom selected from the group consisting of oxygen, sulfur and nitrogen wherein the substituents are selected from the group consisting of alkyl and halogen. The compounds of this invention are useful as herbicides.

This is a continuation of application Ser. No. 781,578, filed Dec. 5, 1968, now abandoned.

This invention relates to new compositions of matter and more particularly to new chemical compounds of the formula

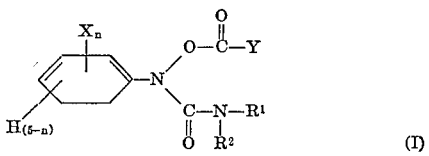

wherein X is selected from the group consisting of alkyl, alkenyl, halogen, haloalkyl, alkoxy, nitro and dialkylamino; $n$ is an integer from 0 to 5; $R^1$ and $R^2$ are independently selected from the group consisting of hydrogen and alkyl; and Y is a substituted or unsubstituted heterocyclic ring consisting of from 3 to 5 carbon atoms and a maximum of 1 atom selected from the group consisting of oxygen, sulfur and nitrogen wherein the substituents are selected from the group consisting of alkyl and halogen. In a preferred embodiment of this invention X is selected from the group consisting of lower alkyl, lower alkenyl, chlorine, bromine, lower haloalkyl, lower alkoxy, nitro and di(lower alkyl)amino; $n$ is an integer from 0 to 3; $R^1$ and $R^2$ are independently selected from the group consisting of hydrogen and lower alkyl; and Y is a substituted or unsubstituted heterocyclic ring selected from the group consisting of pyrrole, furan, tetrahydrofuran, thiophene, tetrahydrothiophene, pyridine and tetrahydropyran wherein the substituents are selected from the group consisting of lower alkyl, chlorine and bromine.

The compounds of the present invention are unexpectedly useful as herbicides.

The new compounds of the present invention can be readily prepared by reacting a hydroxyurea of the formula

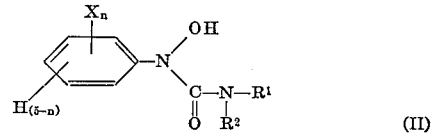

wherein X, $n$, $R^1$ and $R^2$ are as heretofore described, with an acid chloride of the formula

wherein Y is as heretofore described. This reaction can be conveniently carried out in an inert organic reaction medium such as ether by adding an equimolar or slight excess molar amount of the acid chloride of Formula III to the hydroxyurea of Formula II in the presence of an acid scavenger such as a tertiary amine or an alkali metal hydroxide. Mild reaction conditions can be employed to effect this reaction and temperatures from about 0° C. to about 50° C. are preferably utilized. The reaction mixture can then be stirred for a period of from about ½ to about 8 hours to ensure the completion of the reaction. Thereafter the desired product can be recovered by first filtering the reaction mixture to remove the acid scavenger chloride salt and then evaporating the filtrate to yield the desired product as a residue. In some instances wherein the product is insoluble in the reaction medium and forms as a precipitate it is recovered by filtration and is purified by washing with water. The product can then be used as such or can be further purified by conventional techniques well known in the art.

Exemplary suitable hydroxyureas for the purpose of preparing the new compounds of this invention are 1-hydroxy-1-phenylurea,
1-hydroxy-1-phenyl-3-methylurea,
1-hydroxy-1-phenyl-3,3-dimethylurea,
1-hydroxy-1-(2-methylphenyl)-3-methylurea,
1-hydroxy-1-(3-chlorophenyl)-3-methylurea,
1-hydroxy-1-(3,4-dichlorophenyl)-3-methylurea,
1-hydroxy-1-(4-bromophenyl)-3,3-dimethylurea,
1-hydroxy-1-(4-allylphenyl)-3-ethylurea,
1-hydroxy-1-(2-methoxyphenyl)-3-isopropylurea,
1-hydroxy-1-(3-nitrophenyl)-3-methylurea,
1-hydroxy-1-(2-dimethylaminophenyl)-3-methylurea,
1-hydroxy-1-(2-methyl-4-chlorophenyl)-3,3-dimethylurea,
1-hydroxy-1-(3,4,5-trichlorophenyl)-3,3-diethylurea and
1-hydroxy-1-(4-chlorophenyl)-3-methyl-3-t-butylurea.

Exemplary suitable heterocyclic acid chlorides for preparing the compounds of this invention are α-furoyl chloride, β-furoyl chloride, α-thiophenoyl chloride, β-thiophenoyl chloride, tetrahydropyran - 4 - carboxyloyl chloride, picolinoyl chloride, nicotinoyl chloride and isonicotinoyl chloride.

The manner in which the compounds of the present invention can be prepared readily is more specifically illustrated in the following examples.

EXAMPLE 1

Preparation of 1-(3,4-dichlorophenyl)-
1-(α-furoyloxy)-3-methylurea 1-(3,4-dichlorophenyl) - 1 - hydroxy - 3 - methylurea (5 grams) dissolved in dichloromethane (80 ml.) and triethylamine (4 ml.) were charged into a glass reaction vessel equipped with a mechanical stirrer. The mixture was cooled to a temperature of about 10° C. and α-furoyl chloride (2.9 grams) was added thereto. After the addition was completed the reaction mixture was stirred for a period of about ½ hour. The reaction mixture was then washed with water and was dried over anhydrous magnesium sulfate. The dried solution was stripped of solvent and the resulting residue was recrystallized from methanol to yield the desired product 1-(3,4-dichlorophenyl)-1-(α-furoyloxy)-3-methylurea as a tan crystalline solid having a melting point of 104 to 105° C.

EXAMPLE 2

Preparation of 1-(2-methyl-4-chlorophenyl)-1-(α-pyrrolylcarbonyloxy-3-ethylurea

A solution of 1-(2-methyl-4-chlorophenyl)-1-hydroxy-3-ethylurea (23 grams; 0.1 mol) in chloroform (150 ml.) and triethylamine (11 grams) are charged into a glass reaction vessel equipped with a mechanical stirrer. The mixture is cooled to a temperature of about 0° C. and α-pyrrolylcarbonyl chloride (10.6 grams; 0.1 mol) is slowly added thereto. After the addition is completed the mixture is stirred for an additional period of about 1 hour. After this time the reaction mixture is filtered to remove the triethylamine hydrochloride, is washed with water and is dried over anhydrous magnesium sulfate. The dried solution is then stripped of solvent and the resulting residue is recrystallized to yield the desired product 1-(2-methyl-4-chlorophenyl)-1-(α - pyrrolylcarbonyloxy)-3-ethylurea.

EXAMPLE 3

Preparation of 1-(3-bromophenyl)-1-(α-thenoyloxy)-3,3-dimethylurea

A solution of 1-(3-bromophenyl)-1-hydroxy-3,3-dimethylurea (24.7 grams; 0.1 mol) in dichloromethane (100 ml.) and triethylamine (11 grams) are charged into a glass reaction vessel equipped with a mechanical stirrer. The mixture is cooled to a temperature of about 5° C. and α-thenoyl chloride is slowly added thereto. After the addition is completed the reaction mixture is warmed to room temperature and is stirred for a period of about 1 hour. After this time the mixture is filtered to remove the triethylamine hydrochloride, is washed with water and is dried over anhydrous magnesium sulfate. The dried solution is then stripped of solvent and the resulting residue is recrystallized to yield the desired product 1-(3-bromophenyl)-1-(α-thenoyloxy)-3,3-dimethylurea.

EXAMPLE 4

Preparation of 1-(2-methoxy-4-chlorophenyl)-1-(4-tetrahydropyranylcarbonyloxy)-3-methylurea A solution of 1-(2-methoxy-4-chlorophenyl)-1-hydroxy-3-methylurea (23 grams; 0.1 mol) in chloroform (200 ml.) and triethylamine (11 grams) are charged into a glass reaction vessel equipped with a mechanical stirrer. The mixture is cooled to a temperature of about 10° C. and tetrahydropyran-4-carbonyl chloride (15 grams; 0.1 mol) is slowly added thereto. After the addition is completed the mixture is allowed to warm up to room temperature and is stirred for a period of about 1 hour. After this time the reaction mixture is filtered to remove the triethylamine hydrochloride which has formed, is washed with water and is dried over anhydrous magnesium sulfate. The dried solution is stripped of solvent and the resulting residue is recrystallized to yield the desired product 1 - (2 - methoxy-4-chlorophenyl)-1-(4-tetrahydropyranylcarbonyloxy)-3-methylurea.

EXAMPLE 5

Preparation of 1-(4-dimethylaminophenyl)-1-picolinoyloxy-3-methylurea

A solution of 1-(4-dimethylaminophenyl)-1-hydroxy-3-methylurea (21 grams; 0.1 mol) in dichloromethane (150 ml.) and triethylamine (11 grams) are charged into a glass reaction vessel equipped with a mechanical stirrer. The reaction mixture is cooled to a temperature of about 5° C. and picolinoyl chloride (12.7 grams; 0.1 mol) is slowly added thereto. After the addition is completed the mixture is warmed to room temperature and is stirred for a period of about 1 hour. After this time the mixture is filtered to remove the triethylamine hydrochloride, is washed with water and is dried over anhydrous magnesium sulfate. The dried solution is then stripped of solvent under reduced pressure to yield the desired product 1-(4-dimethylaminophenyl)-1-picolinoyloxy-3 - methylurea as the residue.

EXAMPLE 6

Preparation of 1-(3-trifluoromethylphenyl)-1-nicotinoyloxy-3-ethylurea

A solution of 1-(3-trifluoromethylphenyl)-1-hydroxy-3-ethylurea (22 grams; 0.1 mol) in dichloromethane (200 ml.) and triethylamine (11 grams) are charged into a glass reaction vessel equipped with a mechanical stirrer. The reaction mixture is cooled to a temperature of about 0° C. and nicotinoyl chloride (12.7 grams; 0.1 mol) is slowly added thereto. After the addition is completed the mixture is warmed to room temperature and is stirred for a period of about 1 hour. After this time the mixture is filtered to remove the triethylamine hydrochloride, is washed with water and is dried over anhydrous magnesium sulfate. The dried solution is then stripped of solvent under reduced pressure to yield the desired product 1-(3-trifluoromethylphenyl)-1-nicotinoyloxy-3 - ethylurea as the residue.

EXAMPLE 7

Preparation of 1-(3-Nitrophenyl)-1-isonicotinoyloxy-3-methylurea

A solution of 1-(3-nitrophenyl)-1-hydroxy-3-methylurea (21 grams; 0.1 mol) in carbon tetrachloride (100 ml.) and triethylamine (11 grams) are charged into a glass reaction vessel equipped with a mechanical stirrer. The mixture is cooled to a temperature of about 10° C. and isonicotinoyl chloride (12.7 grams; 0.1 mol) is slowly added thereto. After the addition is completed the reaction mixture is warmed to room temperature and is stirred for a period of about 2 hours. After this time the mixture is filtered to remove the triethylamine hydrochloride which is formed, is washed with water and is dried over anhydrous magnesium sulfate. The dried solution is then evaporated under reduced pressure to yield the desired product 1-(3-nitrophenyl)-1-nicotinoyloxy-3-methylurea as the residue.

Additional compounds within the scope of the present invention which can be prepared in a manner similar to that described in the foregoing examples and which are presented by way of illustration and are not intended to limit the scope of this invention thereto are:

1-(3-ethyl-5-iodophenyl)-1-(β-furoyloxy)-3,3-diethylurea
1-(4-allylphenyl)-1-(α-methyl-β-furoyloxy)-3-isopropylurea
1-(4-trichloromethylphenyl)-1-(α-chloro-β-furoyloxy)-3-n-butylurea
1-(2-ethoxy-4-isopropylphenyl)-1-pyrrolylcarbonyloxy-3-n-pentylurea
1-(3-n-butyl-5-nitrophenyl)-1-(3-methyl-2-pyrrolylcarbonyloxy)-3-methylurea
1-(4-di-n-propylaminophenyl)-1-(3-chloro-2-pyrrolylcarbonyloxy)-3,3-di-n-hexylurea
1-(4-pent-3-enylphenyl)-1-pyranylcarbonyloxy-3-n-decylurea
1-(4-t-butyloxyphenyl)-1-(4-chloropicolinoyloxy)-3,3-dimethylurea
1-(4-di-n-decylaminophenyl)-1-(5-bromonicotinoyloxy)-3,3-diethylurea
1-(3-n-hexyloxyphenyl)-1-(2-n-propylisonicotinoyloxy)-3-methylurea
1-(4-n-decylphenyl)-1-(2-methyl-6-chloronicotinoyloxy)-3-n-pentylurea 1-(4-fluorophenyl)-1-(3-methyl-2-thenoyloxy)-3-methylurea 1-(2,6-dimethoxy-4-chlorophenyl)-1-(4-methyltetrahydropyran-2-ylcarbonyloxy)-3-methylurea.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestation.

A typical herbicidal composition according to this invention is illustrated by the following example, in which the quantities are in parts by weight.

EXAMPLE 8

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and, as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, desiccants, growth inhibitors, and the like in the herbicidal compositions heretofore described. These other materials can comprise from about 5% to about 95% of the active ingredients in the herbicidal compositions. Use of combinations of these other herbicides and/or defoliants, desiccants, etc. with the compounds of the present invention provide herbicidal compositions which are more effective in controlling weeds and often provide results unattainable with separate compositions of the individual herbicides. The other herbicides, defoliants, desiccants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex, and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate, and the like; substituted urea herbicides such as norea, siduron, dichloral urea, chloroxuron, cycluron, fenuron, monuron, monuron TCA, diuron, linuron, monolinuron, neburon, buturon, trimeturon, and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4 - (chloroacetyl)morpholine, 1-(chloroacetyl)piperidine, and the like; chlorinated aliphatic acid herbicides such as TCA, dalapon, 2,3-dichloropropionic acid, 2,2,3-TPA, and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid 3-methoxy-2,6-dichlorophenylacetic acid, 2-methoxy-3,5,6-trichlorophenylacetic acid, 2,4-dichloro-3-nitrobenzoic acid, and the like; and such compounds as aminotriazole, maleic hydrazide, phenyl mercuric acetate, endothal biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, O-S-dimethyl tetrachlorothioterephthalate, methyl 2,3,5,6 - tetrachloro-N-methoxy-N-methylterephthalamate, 2-[(4 - chloro-o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP–50144, H–176–1, H–732, M–2901, planavin, sodium tetraborate, calcium cyanamid, DEF, ethyl xanthogen disulfide, sindone, sindone B, propanil, and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lamb's-quarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curly dock, nutgrass, field chickeed, dandelion, campanula, field bindweed, Russian knapweed, mesquite, toad-flax, yarrow, aster, gromwell, horsetail, ironweed, sesbania, bulrush, cattail and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of various weeds. In these experiments small plastic greenhouse pots filled with dry soil were seeded with the weed seeds. Twenty-four hours or less after seeding the pots were sprayed with water until the soil was wet and 1-(3,4-dichlorophenyl)-1-(α-furoyloxy)-3-methylurea formulated as an aqueous emulsion of an acetone solution containing emulsifiers was sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0=no injury; 1, 2=slight injury; 3, 4=moderate injury; 5, 6=moderately severe injury; 7, 8, 9=severe injury and 10=death. Average values are given for data obtained from replicate experiments. The effectiveness of these compounds is demonstrated by the following data:

TABLE I

| Weed species | Concentration of test compound in lbs. per acre | Injury rating |
| --- | --- | --- |
| Coffee weed | 8 | 10 |
| Do | 4 | 7 |
| Crabgrass | 8 | 8 |
| Do | 4 | 5.5 |
| Curly dock | 8 | 9 |
| Do | 4 | 7.5 |
| Foxtail | 8 | 9 |
| Do | 4 | 4 |
| Pigweed | 8 | 9 |
| Do | 4 | 7 |

The herbicidal activity of the compounds of this invention was also demonstrated by experiments carried out for the post-emergence control of various needs. In these experiments the compound 1-(3,4-dichlorophenyl)-1-(α-furoyloxy)-3-methylurea was formulated as an aqueous emulsion and sprayed at the indicated dosage on the foliage of various weeds that had attained a prescribed size. After spraying, the plants were placed in a greenhouse and watered daily or more frequently. Water was not applied to the foliage of the treated plants. The severity of the injury was determined 10 to 15 days after treatment and was rated on the scale of from 0 to 10 heretofore described. The effectiveness of these compounds is demonstrated by the following data:

TABLE II

| Weed species | Concentration of test compound in lbs. per acre | Injury rating |
| --- | --- | --- |
| Barnyard grass | 8 | 8 |
| Do | 4 | 5 |
| Coffee weed | 8 | 10 |
| Do | 4 | 9 |
| Curly dock | 8 | 9 |
| Do | 4 | 9 |
| Matricaria | 8 | 9 |
| Do | 4 | 8.5 |
| Mustard | 8 | 10 |
| Do | 4 | 10 |
| Velvet leaf | 8 | 9 |
| Do | 4 | 8.5 |

We claim:
1. A compound of the formula

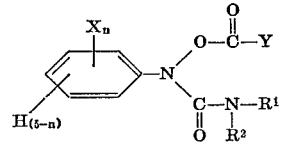

wherein X is selected from the group consisting of lower alkyl, lower alkenyl, chlorine, bromine, lower haloalkyl, lower alkoxy, nitro and di (lower alkyl)amino; n is an integer from 0 to 3; R¹ and R² are independently selected from the group consisting of hydrogen and lower alkyl; and Y is a substituted or unsubstituted heterocyclic ring consisting of furan and tetrahydrofuran wherein substituents are selected from the group consisting of lower alkyl, chlorine and bromine.

2. The compound of Claim 1, 1-(3,4-dichlorophenyl)-1-(α-furoyloxy)-3-methylurea.

References Cited

FOREIGN PATENTS 182,729   6/1966   U.S.S.R.

NATALIE TROUSOF, Primary Examiner

B. DENTZ, Assistant Examiner

U.S. Cl. X.R.

71—88, 90, 94, 95; 200—239 R, 295 E, 326.2, 295.5 O, 332.2 C, 345.7